United States Patent
Lehmann et al.

(10) Patent No.: US 7,141,276 B2
(45) Date of Patent: Nov. 28, 2006

(54) HYDROPHOBIC PERMANENT COATINGS ON SUBSTRATES AND METHODS FOR PRODUCTION THEREOF

(75) Inventors: Dieter Lehmann, Coswig (DE); Dietmar Appelhans, Dresden (DE); Michaela Gedan-Smolka, Ortrand (DE)

(73) Assignee: Leibniz-Institut Fuer Polymerforschung Dresden E.V., Dresden (DE)

( * ) Notice: Subject to any disclaimer, the term of this patent is extended or adjusted under 35 U.S.C. 154(b) by 21 days.

(21) Appl. No.: 10/475,516

(22) PCT Filed: Apr. 19, 2002

(86) PCT No.: PCT/DE02/01494

§ 371 (c)(1),
(2), (4) Date: Oct. 27, 2003

(87) PCT Pub. No.: WO02/087784

PCT Pub. Date: Nov. 7, 2002

(65) Prior Publication Data

US 2004/0126589 A1    Jul. 1, 2004

(30) Foreign Application Priority Data

Apr. 25, 2001  (DE) ................. 101 20 989

(51) Int. Cl.
  *B05D 3/02*  (2006.01)
  *B05D 3/06*  (2006.01)
(52) U.S. Cl. .............. 427/492; 427/493; 427/379; 427/385.5; 427/386
(58) Field of Classification Search ........... 427/385.5, 427/493
  See application file for complete search history.

(56) References Cited

U.S. PATENT DOCUMENTS

| | | |
|---|---|---|
| 4,164,487 A | 8/1979 | Martin |
| 4,289,812 A | 9/1981 | Martin |
| 4,959,426 A | 9/1990 | Re et al. |
| 5,376,441 A | 12/1994 | Wu et al. |
| 5,460,872 A | 10/1995 | Wu et al. |
| 5,539,072 A | 7/1996 | Wu |
| 5,548,019 A | 8/1996 | Kawakami et al. |
| 5,674,951 A | 10/1997 | Hargis et al. |
| 5,853,894 A | 12/1998 | Brown |
| 5,859,126 A | 1/1999 | Anton et al. |
| 6,001,923 A | 12/1999 | Moncur et al. |
| 6,156,389 A | 12/2000 | Brown et al. |
| 6,447,919 B1 | 9/2002 | Brown et al. |
| 6,770,378 B1 * | 8/2004 | Lehmann ............. 428/474.4 |

FOREIGN PATENT DOCUMENTS

| | | |
|---|---|---|
| DE | 2757733 | 7/1978 |
| EP | 0271873 | 6/1988 |
| WO | 95/26881 | 10/1995 |
| WO | 96/05172 | 2/1996 |
| WO | 98/51727 | 11/1998 |

OTHER PUBLICATIONS

Appelhans et al, European Coatings Journal, No. 4, pp. 24-31, 2004.*
Appelhans et al, European Coatings Conference 2004, pp. 237-256.*
W. Barthlott et al., "Purity of the Sacred Lotus, or Escape from Contamination in Biological Surfaces", Planta, vol. 202, pp. 1-8 (1997).
Richard R. Thomas et al., "Preparation and Surface Properties of Acrylic Polymers Containing Fluorinated Monomers", Macromolecules, vol. 30, pp. 2883-2890 (1997).
Toby M. Chapman et al., "Determination of Low Critical Surface Tensions of Novel Fluorinated Poly(amide urethane) Block Copolymers.1. Fluorinated Side Chains", Macromolecules, vol. 28, pp. 331-335 (1995).
Eugenia Dessipri et al., Fluorinated Poly($\alpha$,L-glutamate)s@, Macromolecules, vol. 29, pp. 3525-3551 (1996).
F. Ciardelli et al., ANew Fluorinated Acrylic Polymers for Improving Weatherability of Building Stone Materials@, Progress in Organic Coatings, vol. 32, pp. 43-50, (1997).
Weihua Ming et al., ASynthesis and Surface Properties of Films Based on Solventless Liquid Fluorinated Oligoester@, Macromolecules, vol. 33, pp. 6886-6891 (2000).

* cited by examiner

*Primary Examiner*—Erma Cameron
(74) *Attorney, Agent, or Firm*—Greenblum & Bernstein, P.L.C.

(57) ABSTRACT

The invention is used in the field of chemistry and relates to coatings which can be used, for example, for the production of paint films, and a method for production thereof.

The object of the invention is to describe permanent coatings with hydrophobic to ultrahydrophobic properties.

The object is attained by hydrophobic permanent coatings of a crosslinked layer of a hardener component (A) and resin component (B), whereby (A) and/or (B) comprise chemically coupled lateral and/or terminal perfluoroalkyl groups with at least one trifluoromethyl end group, with a coupling between the layer and the surface region of the substrate.

The object is further attained with a method in which the coating agent containing perfluoroalkyl groups is applied to a surface in the form of a melt, powder, dispersion or solution, with input of energy a film formation is carried out in one or more stages with or without a partial cross-linking and at least one partial coupling and subsequently again with input of energy a complete cross-linking of the layer is carried out.

26 Claims, No Drawings

HYDROPHOBIC PERMANENT COATINGS ON SUBSTRATES AND METHODS FOR PRODUCTION THEREOF

FIELD OF APPLICATION OF THE INVENTION

The invention is used in the field of chemistry and relates to hydrophobic permanent coatings on substrates, which can be used, for example, for the production of paint films, and a method for production thereof.

DESCRIPTION OF BACKGROUND INFORMATION

Liquid paint systems are known that contain solvent and thus do not comply with the more recent requirements for freedom from emissions. Furthermore the more recent requirements insist on the greatest possible water-, oil-, dust-, dirt-repellent, and scratch-resistant surface properties, as well as improved slip properties of coated surfaces.

To this end the coating surfaces have previously been made hydrophobic by physically immersed or chemically bound perfluorinated additives. According to Barthlott et al., Planta 1997, 202, 1, an ultrahydrophobic layer property is understood to mean that the contact angle with a droplet of water placed on it is >130°.

For the coating of such hydrophobed surfaces, various coating agents based on polyurethanes, polyamides, polyesters, or polyacrylic acid derivatives were used, in particular polymers with perfluorinated side groups or blocks.

According to Thomas et al., Macromolecules 1997, 30, 2883, a coating agent containing perfluoroalkyl groups is known as a polymer solution based on acrylic acid esters containing perfluoroalkyl groups with alkylated and aromatic side groups and an isocyanate as a crosslinking agent/hardener. The surface hydrophobia is described with a contact angle of $\leq 117°$. No ultrahydrophobic properties of the coated surface are achieved therewith.

According to Chapman et al., Macromolecules 1995, 28, 331, the synthesis of poly(amide urethane) block copolymers with perfluoroalkyl-containing side groups in solution is known for use as a coating agent. This method is very laborious and the contact angles achieved resulted in values of $\leq 116°$.

Tirrell et al., Macromolecules 1996, 29, 3545, synthesized polyamide homopolymers that contain perfluoroalkyl-containing side groups, on the basis of perfluorinated glutamic acid derivatives for use as coating agents. Here too, only contact angles of $\leq 120°$ could be shown for the surface hydrophobia.

According to Ciradelli, F. et al., Progress in Organic Coatings 1997, 32, 43, long-chained perfluoroalkyl-containing side groups were inserted into acrylic acid ester copolymers and tested as coating agents. Contact angles of 130 to 146° could be achieved on the coated stone surfaces therewith. However, the synthesized copolymers were stated to be very unstable as far as their resistance to hydrolysis was concerned.

Similarly, Ming et al., Macromolecules 2000, 33, 6886, showed that polyesters with perfluoroalkylated end groups feature hydrophobic effects, but these are not stable over the long term.

According to U.S. Pat. No. 5,548,019 perfluoroalkylated chain blocks were inserted covalently into a polymer main chain in order to obtain aqueous and/or solvent-containing coating agents with perfluoroalkylated chain blocks.

According to U.S. Pat. No. 5,674,951, perfluoroalkylated side groups have been inserted covalently into polyoxetanes with the same goal.

In both cases these polymers with polyurethanes in various perfluoroalkyl-containing percentages by weight, have been hardened from an aqueous or solvent-containing solution after application to the surface to be coated. In neither case could be achieved ultrahydrophobic properties.

According to U.S. Pat. No. 5,859,126, a method for the production of hydrophobic layers via an autoxidation and polymerization for the crosslinking of a urethane resin with unsaturated perfluoroalkylated fatty acid esters is known. The coated surfaces obtained therewith featured a contact angle of <130°.

Through U.S. Pat. No. 6,001,923 polyurethane coatings containing perfluoroalkyl groups are known that are obtained by reacting end-group-terminated perfluoroalkyl compounds or perfluoroalkylated polyether diols as a soft chain block with free diisocyanates in the presence of dibutyltin dilaurate and optionally binders containing hydroxyl groups to produce prepolymers.

According to WO 98/51727 the insertion of perfluoroalkyl compounds based on polyether diols has been implemented with a similar approach, which compounds were tested as coating agents.

In both cases, no ultrahydrophobic properties could be achieved.

A further method for attaching perfluoroalkylated side chains to the main chain is the synthesis of specific acrylic acid ester resins (WO 96/05172). A greater chemical stability is achieved thereby via the reaction of a diisocyanate coupling agent between the perfluoroalkylated alcohol unit and the OH-functionalized acrylic acid ester. Here too the coating agents are applied from the solution to the textile surface to be treated. Hydrophobic properties could be shown.

The disadvantage with all the known solutions is that no lasting ultrahydrophobic properties are achieved with the coated surfaces.

SUMMARY OF THE INVENTION

The object of the invention is to describe permanent coatings that feature hydrophobic to ultrahydrophobic properties, and a simple method for their production that is uncomplicated to implement.

The present invention is directed to a hydrophobic permanent coating on a substrate, comprising a crosslinked layer of coating agent containing perfluoroalkyl groups composed of at least one hardener component (A) and at least one resin component (B), at least one of the at least one hardener component (A) and the at least one resin component (B) includes at least one of chemically coupled lateral and terminal perfluoroalkyl groups with at least one trifluoromethyl end group, and a coupling between the crosslinked layer and a surface region of the substrate.

The present invention is also directed to a method for the production of hydrophobic permanent coatings on substrates according to the present invention comprising applying to a surface as a melt, powder, dispersion or solution a coating agent containing perfluoroalkyl groups, carrying out with input of energy a film formation with or without a partial crosslinking of the layer constituents and at least one partial coupling of the layer with the surface region of the substrate in at least one stage and then, again with input of energy, carrying out complete crosslinking of the layer.

The at least one hardener component (A) can be at least one of a (poly)epoxy-, blocked (poly)isocyanate-, and (poly) uretdione compound that includes at least one of (A1) at least one of chemically coupled lateral and terminal perfluoroalkyl groups with at least one trifluoromethyl end group, and (A2) that does not include perfluoroalkyl groups.

The at least one hardener component (A) can be at least one of a (poly)epoxy-, blocked (poly)isocyanate-, and (poly) uretdione compound, and includes at least one of low molecular weight, oligomeric and polymeric photoinitiators, and the compound includes at least one of (A3) at least one of chemically coupled lateral and terminal perfluoroalkyl groups with at least one trifluoromethyl end group, and (A4) does not include perfluoroalkyl groups.

The at least one hardener component (A) can include olefinically unsaturated groups, the olefinically unsaturated groups can be (meth)acrylates.

The at least one hardener component (A) can be at least one of a low molecular weight, oligomeric and polymeric photoinitiator with functional groups that include (A5) at least one of chemically coupled lateral and terminal perfluoroalkyl groups with at least one trifluoromethyl end group, and (A6) does not include perfluoroalkyl groups.

The functional groups of the at least one hardener component (A) can be at least one of epoxy-, blocked isocyanate- and uretdione groups, or at least one of amino-, hydroxy- and carboxylic acid groups.

The at least one resin component (B) is at least one of a polyester, polyurethane and poly(meth)acrylate each with functional groups, and includes at least one of (B1) at least one of chemically coupled lateral and terminal perfluoroalkyl groups with at least one trifluoromethyl end group, B2) does not include perfluoroalkyl groups.

The functional groups of the at least one resin component (B) can be at least one of amino-, hydroxy- and carboxylic acid groups.

The at least one resin component (B) can include functional groups and olefinically unsaturated groups. The olefinically unsaturated groups of the at least one resin component (B) can be (meth)acrylates.

The at least one resin component (B) can be polymers with olefinically unsaturated groups and further functional groups, that include (B3) at least one of chemically coupled lateral and terminal perfluoroalkyl groups with at least one trifluoromethyl end group, and (B4) does not include perfluoroalkyl groups.

The functional groups of the at least one resin component (B) can be at least one of amino-, hydroxy- and carboxylic acid groups.

The coating agent can include 0.1 to 70% by wt of at least one of chemically coupled lateral and terminal perfluoroalkyl groups with at least one trifluoromethyl end group.

The coating agent can include 1 to 30% by wt of at least one of chemically coupled lateral and terminal perfluoroalkyl groups with at least one trifluoromethyl end group.

Bonding of the at least one of chemically coupled lateral and terminal perfluoroalkyl groups with at least one trifluoromethyl end group with at least one of the at least one hardener component (A) and the resin component (B) can take place via one or more spacer chains with a chain length of 1–60 C atoms. The spacer chains can comprise at least one of unbranched and branched spacer chains including functional groups. The functional groups of the spacer chains can be at least one of ether-, carboxylic acid ester-, carboxylic acid amide-, sulfonic acid amide-, imide-, urethane-, urea-, keto-, sulfide- and sulfone groups.

The perfluoroalkyl group can have a chain length of 2 to 25 C atoms.

The perfluoroalkyl group can be chemically coupled to at least one of the at least one hardener component (A) and the at least one resin component (B) via at least one of a functional group, a functionalized alkylene chain, an arylene chain, an alkylenearylene chain, an alkylenearylenealkylene chain, an arylenealkylene chain and an arylenealkylenearylene chain.

The functional group can be at least one of ether-, ester-, urethane-, urea-, carboxylic acid amide-, imide-, sulfonic acid amide-, sulfone groups and C—C single or double bonds.

The functionalized chains can comprise at least one of unbranched and branched chains including at least one of cycloaliphatic and heterocyclic units.

The coating can, include auxiliary agents and additives.

The coupling between the crosslinked layer and the substrate surface region via can comprise covalent bonding.

The coupling between the crosslinked layer and the substrate surface region can additionally includes noncovalent bonds in a form of at least one of ionic/electrostatic and van der Waals bonds.

The substrate surface can include reactive functional groups.

The reactive functional groups at the substrate surface can be at least one of hydroxy groups and amino groups.

The reactive functional groups at the substrate surface can be at least one of free or blocked isocyanate groups, epoxy groups, uretdione groups and allophanate groups.

The reactive functional groups at the substrate surface can be at least one of carboxylic acid ester groups, carboxylic acid groups, photochemically reactive keto groups and (meth)acrylate groups.

The film formation is carried out thermally and the partial crosslinking can be carried out thermally at least one of uncatalyzed, catalyzed, radiation-chemically and photochemically.

At least one of a thermally catalyzed and uncatalyzed crosslinking can be carried out.

At least one of a thermally catalyzed and uncatalyzed partial crosslinking and at least one of a photochemical and radiation-chemical complete crosslinking cancan be carried out.

At least one of a photochemical and radiation-chemical crosslinking can be carried out.

Energy input can be realized by raising temperature.

During the film formation and partial crosslinking and partial coupling, the coated substrate can be heated to a temperature of up to 150° C., and after a storage or immediately afterwards, can be heated further to the crosslinking temperature to complete the crosslinking.

The objects of the present invention are attained by invention described in the present application and through the guidance disclosed herein.

DETAILED DESCRIPTION OF THE INVENTION

It was possible to attain the object with the preparation of the coating agents containing perfluoroalkyl groups according to the invention.

The coating agents containing perfluoroalkyl groups comprise the hardener component (A) and resin component (B) with specific functional groups that are processed to produce a crosslinked layer and that are coupled to the surface region of the substrate. This is attained according to the invention in that via at least a two-stage or multi-stage reaction, which can run parallel and/or successively, on the one hand with the thermal film formation of the coating agents containing perfluoroalkyl groups, a chemical coupling is effected at the substrate surface between the coating agents and the substrate surface, and on the other hand partial crosslinkings and crosslinkings of the coating agents containing perfluoroalkyl groups are effected advantageously in the region of ≦160° C. by selection of the hardening method. The resulting hardened coatings containing perfluoroalkyl groups feature permanent hydrophobic to ultrahydrophobic surface properties.

In the production of the coatings according to the invention the individual partial stages can advantageously be film formation and crosslinking with the coupling between coating agents containing perfluoroalkyl groups and substrate surface:

a) A thermal film formation with subsequent catalyzed and/or uncatalyzed thermal partial crosslinking and complete crosslinking, b) A thermal film formation and simultaneous catalyzed and/or uncatalyzed partial crosslinking and simultaneous or subsequent photochemical and/or subsequent radiation-chemical crosslinking, c) A thermal film formation and simultaneous or subsequent photochemical and/or subsequent radiation-chemical crosslinking.

The coating agents containing perfluoroalkyl groups that are used can advantageously be applied to the substrate surfaces as a melt, powder, dispersion, or solution.

The hardener component (A) contained in the coating agents containing perfluoroalkyl groups for the catalyzed and/or uncatalyzed thermal crosslinking is advantageously (poly)epoxy- and/or blocked (poly)isocyanate- and/or (poly) uretdione compounds. The hardener component used thereby has chemically coupled lateral and/or terminal perfluoroalkyl groups with at least one trifluoromethyl end group. If the resin component (B) features such perfluoroalkyl groups, the hardener component (A) can also have no perfluoroalkyl groups.

The hardener component (A) contained in the coating agents containing perfluoroalkyl groups for the thermal film formation and catalyzed and/or uncatalyzed thermal pre-crosslinking and simultaneous or subsequent photochemical and/or subsequent radiation-chemical crosslinking is advantageously (poly)epoxy- and/or blocked (poly)isocyanate- and/or (poly)uretdione compounds for the precrosslinking- and coupling reaction to the substrate surface and low molecular weight and/or oligomeric and/or polymeric photoinitiators for the photochemical crosslinking reaction and optionally additional olefinically unsaturated groups, preferably (meth)acrylate-based, for the photochemical and/or radiation-chemical crosslinking. The hardener component used thereby has chemically coupled lateral and/or terminal perfluoroalkyl groups with at least one trifluoromethyl end group. If the resin component (B) features such perfluoroalkyl groups, the hardener component (A) can also have no perfluoroalkyl groups.

The hardener component (A) contained in the coating agents containing perfluoroalkyl groups according to the invention for the thermal film formation and simultaneous or subsequent photochemical and/or subsequent radiation-chemical crosslinking is advantageously low molecular weight and/or oligomeric and/or polymeric photoinitiators and optionally in addition olefinically unsaturated groups, preferably (meth)acrylate-based. The hardener component used thereby has chemically coupled lateral and/or terminal perfluoroalkyl groups with at least one trifluoromethyl end group. If the resin component (B) features such perfluoroalkyl groups, the hardener component (A) can also have no perfluoroalkyl groups.

The hardener component (A) has additional epoxy- and/or blocked isocyanate- and/or uretdione groups for the formation of covalent bonds with functional groups of the substrate surface. Alternatively, amino- and/or hydroxy- and/or carboxylic acid groups, which can form covalent bonds with remaining reactive groups of the substrate surface, can be present in the hardener component (A).

The resin component (B) contained in the coating agents containing perfluoroalkyl groups for the various process steps for the thermal film formation, the partial crosslinking and complete crosslinking, and for the coupling between coating agents containing perfluoroalkyl groups and substrate surfaces is variously functionalized polymers.

The resin component (B) contained in the coating agents containing perfluoroalkyl groups for the catalyzed and/or uncatalyzed thermal crosslinking is advantageously polyester- and/or polyurethane- and/or poly(meth)acrylate classes of substances with functional groups in the form of amino- and/or hydroxy- and/or carboxylic acid groups. The resin component (B) used thereby has chemically coupled lateral and/or terminal perfluoroalkyl groups with at least one trifluoromethyl end group. If the hardener component (A) features such perfluoroalkyl groups, the resin component (B) can also have no perfluoroalkyl groups.

The functional groups present in the form of amino- and/or hydroxy- and/or carboxylic acid groups are advantageously to be used for the complete crosslinking and for the formation of covalent bonds with the substrate surface, which form covalent bonds with remaining reactive groups of the substrate surface.

The resin component (B) contained in the coating agents containing perfluoroalkyl groups for the thermal film formation and catalyzed and/or uncatalyzed thermal partial crosslinking and simultaneous or subsequent photochemical and/or subsequent radiation-chemical crosslinking is advantageously polyester- and/or polyurethane- and/or poly(meth) acrylate classes of substances with functional groups in the form of amino- and/or hydroxy- and/or carboxylic acid groups for the partial crosslinking and for the formation of covalent bonds with the substrate surface, which form covalent bonds with remaining reactive groups of the substrate surface, and additionally feature olefinically unsaturated groups, preferably (meth)acrylate-based, for the photochemical and/or radiation-chemical crosslinking. The resin component (B) used thereby has chemically coupled lateral and/or terminal perfluoroalkyl groups with at least one trifluoromethyl end group. If the hardener component (A) features such perfluoroalkyl groups, the resin component (B) can also have no perfluoroalkyl groups.

The resin component (B) contained in the coating agents containing perfluoroalkyl groups for the thermal film formation and simultaneous or subsequent photochemical and/or subsequent radiation-chemical crosslinking is polymers with olefinically unsaturated groups, preferably (meth)acrylate-based, for the photochemical and/or radiation-chemical crosslinking, and with additional functional groups in the form of amino- and/or hydroxy- and/or carboxylic acid groups for the formation of covalent bonds with remaining reactive groups of the substrate surface. The resin component (B) used thereby has chemically coupled lateral and/or terminal perfluoroalkyl groups with at least one trifluoromethyl end group. If the hardener component (A) features such perfluoroalkyl groups, the resin component (B) can also have no perfluoroalkyl groups.

The additives contained in the coating agents containing perfluoroalkyl groups for the various process steps for the thermal film formation, for the partial crosslinking and complete crosslinking, and for the coupling between coating agents containing perfluoroalkyl groups and the substrate surfaces are known additives and auxiliary agents, which are added in known percentages by weight. Such additives can be used, for example, for the production of the coating agents containing perfluoroalkyl groups as a melt, powder, dispersion, or solution.

The catalysts contained in the coating agents containing perfluoroalkyl groups for the various process steps for the thermal film formation, for the partial crosslinking and complete crosslinking, and for the coupling between coating agents containing perfluoroalkyl groups and substrate surfaces are known catalysts, which are used in the customary range of $\leq 3\%$ by wt relative to the total weight of hardener component (A) and resin component (B). Care must be taken hereby that the catalysts used for the crosslinking and for the coupling between coating agents containing perfluoroalkyl groups and functionalized substrate surfaces are effective and are not deactivated, in order to be able to implement the parallel and/or successive multi-stage reactions of the various process steps.

The substances containing perfluoroalkyl groups that are used as terminal and/or lateral perfluoroalkyl groups with at least one trifluoromethyl end group chemically coupled in hardener component (A) and/or resin component (B), are present in the coating agents containing perfluoroalkyl groups in amounts of 0.1–70% by wt and preferably 1.0 to 30% by wt.

The substances containing perfluoroalkyl groups that are present as terminal and/or lateral perfluoroalkyl groups with at least one trifluoromethyl end group chemically coupled in hardener component (A) and/or resin component (B), are bound in the coating agents containing perfluoroalkyl groups via one or more, also different, spacer chains with a chain length of 1 to 60 C atoms, whereby the spacer chain can be unbranched and/or branched and can also contain i.a. functional groups such as ether- and/or carboxylic acid ester- and/or carboxylic acid amide- and/or sulfonic acid amide and/or imide- and/or urethane- and/or sulfide- and/or sulfone groups, or are bound directly to the hardener component (A) and/or resin component (B).

Substances containing perfluoroalkyl groups are used in the coating agents containing perfluoroalkyl groups as perfluoroalkyl groups with at least one trifluoromethyl end group that have chain lengths of 2 to 25 C atoms. The perfluoroalkyl groups are bound chemically to the hardener component (A) and/or resin component (B) directly via a functional group and/or via a functionalized alkylene chain and/or via a functionalized arylene chain and/or via a functionalized alkylenearylene chain and/or via a functionalized alkylenearylenealkylene chain and/or via a functionalized arylenealkylene chain and/or via a functionalized arylenealkylenearylene chain. All functionalized chains can also carry cycloaliphatic and/or heterocyclic units.

The substances containing perfluoroalkyl groups that are present chemically coupled in hardener component (A) and/or resin component (B) as terminal and/or lateral perfluoroalkyl groups with at least one trifluoromethyl end group, can be used in the coating agents containing perfluoroalkyl groups as perfluoroalkylcarboxylic acid amide derivatives and/or perfluoroalkylsulfonic acid amide derivatives with at least one functional group in the form of an alkylenehydroxy group, alkyleneamino group, alkylenecarboxylic acid group, alkylenecarboxylic acid ester group, alkyleneepoxy group except in the presence of amino groups, alkylene isocyanate group except in the presence of amino- and hydroxy groups, alkyleneuretdione group, or alkylene carbonate group, or else defined mixtures of such perfluoroalkylcarboxylic acid amide derivatives and/or perfluoroalkylsulfonic acid amide derivatives for the production of modified hardener components (A) and/or resin components (B). Alternatively, the functionalized alkylene chains can have cycloaliphatic and/or aromatic and/or heterocyclic units.

The substances containing perfluoroalkyl groups that are present chemically coupled in the hardener component (A) and/or the resin component (B) as terminal and/or lateral perfluoroalkyl groups with at least one trifluoromethyl end group, can be used in the coating agents containing perfluoroalkyl groups as perfluoroalkylcarboxylic acid, perfluoroalkylcarboxylic acid ester, perfluoroalkylcarboxylic acid halides or perfluoroalkylsulfonic acid halides for the synthesis of modified hardener components (A) and/or resin components (B).

Perfluoroalkyl groups with at least one trifluoromethyl end group can be present bound in the coating agents containing perfluoroalkyl groups as perfluoroalkylalkylene derivative and/or perfluoroalkylarylene derivative with at least one functional group.

Functional groups of the binding site between substances containing perfluoroalkyl groups and hardener component (A) and/or resin component (B) are advantageously ether-, ester-, urethane-, urea-, carboxylic acid amide-, imide-, sulfonic acid amide-, sulfone groups, C—C single or double bonds.

The substrate surface is surfaces that after various known cleaning- or activation steps carry functional groups that form a chemical coupling between the coating agents containing perfluoroalkyl groups and the substrate surface. Functional groups at the substrate surface are advantageously hydroxy-, amino-, epoxy-, isocyanate-, acid groups, in particular carboxylic acid groups, ester-, blocked isocyanate- or uretdione groups.

The coupling performed in the coating agents containing perfluoroalkyl groups for the thermal film formation, the partial crosslinking and complete crosslinking and for the coupling between coating agents containing perfluoroalkyl groups and substrate surface is a question of the formation of covalent bonds in addition to noncovalent bonds in the form of ionic/electrostatic and/or van der Waals bonds.

In the method according to the invention the coating agent containing perfluoroalkyl groups composed of a hardener component (A) and a resin component (B) is applied to a surface as a melt, powder, dispersion, or solution, whereby with input of energy a film formation is carried out with or without a partial crosslinking of the layer constituents and at least one partial coupling of this layer with the surface region of the substrate in one or more stages and subsequently again with input of energy the complete crosslinking of the layer is carried out.

With input of energy is advantageously understood to mean a thermal treatment or photochemical and/or radiation-chemical treatment. The term film formation is understood to mean a partial or complete film formation or a layer application of the coating agent containing perfluoroalkyl groups to a substrate surface.

The method according to the invention can thereby advantageously feature the following process steps:
a) Thermal film formation,
b) Thermally uncatalyzed and/or catalyzed partial crosslinking or radiation-chemical and/or photochemical partial crosslinking,
c) Thermally uncatalyzed or catalyzed crosslinking,
d) Photochemical and/or radiation-chemical crosslinking, whereby the combination of process step a) with process steps b) through d) is advantageous in order to obtain permanent hydrophobic coatings. In addition to the combination of thermal film formation and thermally catalyzed and/or uncatalyzed partial- and complete crosslinking, which can be carried out in a continuous manufacturing process, there is the possibility of running this manufacturing process likewise only up to the partial crosslinking, and of allowing further conversion processes to result with subsequent thermally catalyzed and/or uncatalyzed crosslinking. In the process procedure it must be particularly emphasized that the complete crosslinking is guaranteed at temperatures $\leq 160°$ C. The thermal film formation and subsequent or simultaneous thermally catalyzed and/or uncatalyzed partial crosslinking in a manufacturing process is likewise of great importance, whereby the coating agent containing perfluoroalkyl groups is heated on the substrate surface to be coated for a brief time to $\leq 130°$ C. and after cooling a conversion process takes place with subsequent radiation-chemical crosslinking. This advantageous running of the process by selection of the individual process steps can be improved by selected known catalysts or catalyst systems that enable a coupling between the coating agent containing perfluoroalkyl groups and the substrate surface and a partial crosslinking of the coating agent containing perfluoroalkyl groups at temperatures less than 150° C.

EXAMPLES

The invention is explained in more detail below by several exemplary embodiments.

Example 1

In a laboratory kneader, the polyaddition compound containing uretdione groups [BF 1530] (19.3% by wt) as hardener component (A) and a hydroxyl-terminated carboxyl-group-free polyester (80.7% by wt) as resin component (B) containing perfluoroalkyl groups are homogenized in the melt at 90° C. A total of 8% by wt of chemically coupled perfluorooctanoic acid amide is contained in the resin component (B). The additive- and auxiliary agents white pigment ($TiO_2$), 0.6% by wt and a flow promoter (Acronal 4F) 0.6% by wt as well as catalyst (zinc acetylacetonate, 1% by wt) are added successively to this mass. The homogenized mass is cooled rapidly by introducing liquid nitrogen, reduced in a laboratory grinding unit with a classifying device under cooling, and the powder is dried under vacuum at 30° C.

The powder prepared in this manner is applied electrostatically to a coated substrate surface containing uretdione groups. The thermal film formation and partial coupling between the coating agent containing perfluoroalkyl groups and the coated substrate surface is carried out at 130° C. for 10 min and the thermal crosslinking at 155° C. for 25 min. Contact angle measurements with water on the substrate surface showed an advancing contact angle of 130°. Cross-hatching tests show good adhesion.

Example 2

In a laboratory kneader, the hardener component (Aa) and hardener component (Ab) containing perfluoroalkyl groups (in a ratio of 1:2, both comprising a polyepoxide; Aa and Ab=25.0% by wt) and the resin component (B) containing perfluoroalkyl groups (hydroxyl-terminated polyester, 75.0% by wt) are homogenized in the melt at 90° C. A total of 12% by wt of chemically coupled perfluorooctanoic acid amide is contained. The additive- and auxiliary agents white pigment ($TiO_2$), 0.6% by wt and a flow promoter (Acronal 4F) 0.6% by wt as well as catalyst (2-methylimidazole, 1% by wt) are added successively to this mass.

The homogenized mass is cooled rapidly by introducing liquid nitrogen, reduced in a laboratory grinding unit with a classifying device under cooling, and the powder is dried under vacuum at 30° C.

The powder prepared in this manner is applied electrostatically onto a pretreated structured aluminum surface and is heated to 110° C. for 10 min for the thermal film formation and partial coupling and to 160° C. for 15 min for the thermal crosslinking. Contact angle measurements with water on the substrate surface showed an advancing contact angle of 135°. Cross-hatching tests show good adhesion.

Example 3

In a laboratory kneader, the hardener component (A) and the thermally and radiation-chemically hardenable resin component (B) containing perfluoroalkyl groups in a ratio of 1:3 are homogenized in the melt at 90° C. in accordance with Example 1. Additive-, auxiliary agents, and catalysts are added successively to this mass. Resin component (B) contains a total of 7% by wt of chemically coupled perfluorooctanoic acid amide.

The homogenized mass is cooled rapidly by introducing liquid nitrogen, reduced in a laboratory grinding unit with a classifying device under cooling, and the powder is dried under vacuum at 30° C.

The powder prepared in this manner is applied electrostatically to a primed substrate surface containing epoxide groups and is heated to 120° C. for 5 min for the thermal film formation, partial crosslinking and the coupling. Then the substrate surface is crosslinked radiation-chemically with a radiation dose of 15 kGy. Contact angle measurements with water on the substrate surface showed an advancing contact angle of 125 to 130°. Cross-hatching tests show good adhesion.

Example 4

A coating agent containing perfluoroalkyl groups with a composition according to Example 2, in which the resin component (B) contains radiation-chemically hardenable groups, is applied as a dispersion in water to a primed substrate surface containing epoxide groups. The substrate is heated to 120° C. for 20 min for the thermal film formation and coupling.

Then the substrate surface is irradiated with a radiation dose of 11 kGy. Contact angle measurements with water on the substrate surface showed an advancing contact angle of 125°. Cross-hatching tests show good adhesion.

Example 5

In a laboratory kneader, the hardener component (Aa) and hardener component (Ab) containing perfluoroalkyl groups (in a ratio of 1:2, both comprising a polyepoxide; Aa and Ab =25.0% by wt) and the photocrosslinkable resin component (B) containing perfluoroalkyl groups (hydroxyl-terminated polyester with methacrylate groups, 75.0% by wt) are homogenized in the melt at 90° C. A total of 14% by wt of chemically coupled perfluorooctanoic acid amide is contained. A flow promoter (Acronal 4F) 0.6% by wt as well as catalyst (2-methylimidazole, 0.5% by wt) and 2.0% by wt of benzophenone as a photocrosslinker are added successively to this mass.

The coating agent is applied as an aqueous dispersion to a primed substrate surface containing epoxide groups. The substrate surface is heated to 130° C. for 20 min for the thermal film formation, partial crosslinking, and the coupling. Then the substrate surface is crosslinked by UV irradiation (photochemical crosslinking, 3 min). Contact angle measurements with water on the substrate surface showed an advancing contact angle of 130–140°. Crosshatching tests show good adhesion.

The invention claimed is:

1. A substrate including a hydrophobic permanent coating, comprising:
    a crosslinked layer of coating agent containing perfluoroalkyl groups, the crosslinked layer comprising at least one hardener component (A) and at least one resin component (B);
    at least one of the at least one hardener component (A) and the at least one resin component (B) includes at least one of chemically coupled lateral and terminal perfluoroalkyl groups including at least one trifluoromethyl end group;
    a coupling between the crosslinked layer and a surface region of the substrate;
    the at least one hardener component (A) is at least one compound of a (poly)epoxy-, blocked (poly)isocyanate-, and (poly)uretdione compound, the at least one compound includes at least one of chemically coupled lateral and terminal perfluoroalkyl groups including at least one trifluoromethyl end group;
    at least one spacer chain with a chain length of 1–60 C atoms binding the at least one of chemically coupled lateral and terminal perfluoroalkyl groups including at least one trifluoromethyl end group with at least one of the at least one hardener component (A) and the resin component (B) by at least one of a functional group comprising at least one of ether-, carboxylic acid amide- and sulfonic acid amide-.

2. The substrate including a hydrophobic permanent coating according to claim 1, wherein the at least one resin component (B) is at least one of a polyester, polyurethane and poly(meth)acrylate each with functional groups, and includes at least one of (B1) with at least one of chemically coupled lateral and terminal perfluoroalkyl groups including at least one trifluoromethyl end group, and (B2) which does not include perfluoroalkyl groups.

3. The substrate including a hydrophobic permanent coating according to claim 2, wherein the functional groups of the at least one resin component (B) are at least one of amino-, hydroxy- and carboxylic acid groups.

4. The substrate including a hydrophobic permanent coating according to claim 2, wherein the functional groups of the at least one resin component (B) comprise olefinically unsaturated groups which are (meth)acrylates.

5. The substrate including a hydrophobic permanent coating according to claim 1, wherein the at least one resin component (B) is a polymer with olefinically unsaturated groups and further functional groups, and the further functional groups of the at least one resin component (B) include at least one of chemically coupled lateral and terminal perfluoroalkyl groups including at least one trifluoromethyl end group, and functional groups that do not include peifluoroalkyl groups.

6. The substrate including a hydrophobic permanent coating according to claim 5, wherein the olefinically unsaturated groups of the at least one resin component (B) are poly(meth)acrylates.

7. The substrate including a hydrophobic permanent coating according to claim 5, wherein the functional groups of the at least one resin component (B) are at least one of amino-, hydroxy- and carboxylic acid groups.

8. The substrate including a hydrophobic permanent coating according to claim 1, wherein the coating agent includes 0.1 to 70% by wt of at least one of chemically coupled lateral and terminal perfluoroalkyl groups including at least one trifluoromethyl end group.

9. The substrate including a hydrophobic permanent coating according to claim 8, wherein the coating agent includes 1 to 30% by wt of at least one of chemically coupled lateral and terminal perfluoroalkyl groups including at least one trifluoromethyl end group.

10. The substrate including a hydrophobic permanent coating according to claim 1, wherein the at least one spacer chain comprises at least one of unbranched and branched spacer chains.

11. The substrate including a hydrophobic permanent coating according to claim 1, wherein the perfluoroalkyl group has a chain length of 2 to 25 C atoms.

12. The substrate including a hydrophobic permanent coating according to claim 1, further including additives.

13. The substrate including a hydrophobic permanent coating according to claim 1, wherein the coupling between the crosslinked layer and the substrate surface region comprises covalent bonding.

14. The substrate including a hydrophobic permanent coating according to claim 13, wherein the coupling between the crosslinked layer and the substrate surface region additionally includes noncovalent bonds in a form of at least one of ionic/electrostatic and van der Waals bonds.

15. The substrate including a hydrophobic permanent coating according to claim 1, wherein the substrate surface includes reactive functional groups.

16. The substrate including a hydrophobic permanent coating according to claim 15, wherein the reactive functional groups at the substrate surface are at least one of hydroxy groups and amino groups.

17. The substrate including a hydrophobic permanent coating according to claim 15, wherein the reactive functional groups at the substrate surface are at least one of free or blocked isocyanate groups, epoxy groups, uretdione groups and allophanate groups.

18. The substrate including a hydrophobic permanent coating according to claim 15, wherein the reactive functional groups at the substrate surface are at least one of carboxylic acid ester groups, carboxylic acid groups, photochemically reactive keto groups and (meth)acrylate groups.

19. The substrate including a hydrophobic permanent coating according to claim 1, further including additives and catalysts.

20. A method for the production of hydrophobic permanent coatings on substrates, comprising:
    applying to a surface as a melt, powder, dispersion or solution a coating agent containing perfluoroalkyl groups to form a layer, the layer comprising at least one hardener component (A) and at least one resin component (B); at least one of the at least one hardener component (A) and the at least one resin component (B) includes at least one of chemically coupled lateral and terminal perfluoroalkyl groups including at least one trifluoromethyl end group; the at least one hardener component (A) is at least one of a (poly)epoxy-, blocked (poly)isocyanate-, and (poly)uretdione compound ,the at least one compound includes at least one of chemically coupled lateral and terminal peifluoroalkyl groups including at least one trifluoromethyl end group; at least one spacer chain with a chain length of 1–60 C atoms binding the at least one of chemically coupled lateral and terminal perfluoroalkyl groups including at least one trifluoromethyl end group with at least one of the at least one hardener component (A) and the resin component (B) by at least one of a functional group comprising at least one of ether-, carboxylic acid amide- and sulfonic acid amide-;

carrying out with input of energy a film formation with or without a partial crosslinking of the layer and at least one partial coupling of the layer with the surface region of the substrate in at least one stage; and then, again with input of energy, carrying out complete crosslinking of the layer.

21. The method according to claim 20, wherein the film formation is carried out thermally and the partial crosslinking is carried out by at least one of thermally uncatalyzed, catalyzed, radiation-chemically and photochemically.

22. The method according to claim 20, wherein at least one of thermally catalyzed and uncatalyzed crosslinking is carried out.

23. The method according to claim 20, wherein at least one of a thermally catalyzed and uncatalyzed partial crosslinking and at least one of a photochemical and radiation-chemical complete crosslinking is carried out.

24. The method according to claim 20, wherein at least one of a photochemical and radiation-chemical crosslinking is carried out.

25. The method according to claim 20, wherein energy input is realized by raising temperature.

26. The method according to claim 20, wherein during the film formation and partial crosslinking and partial coupling, the coated substrate is heated to a temperature of up to 150° C., and after a storage or immediately afterwards, is heated further to the crosslinking temperature to complete the crosslinking.

* * * * *